United States Patent [19]

Ogawa

[11] Patent Number: 4,739,417
[45] Date of Patent: Apr. 19, 1988

[54] MULTI-MODE ELECTRONIC CAMERA

[75] Inventor: Kimiaki Ogawa, Tokyo, Japan

[73] Assignee: Asahi Kogaku Kogyo Kabushiki Kaisha, Tokyo, Japan

[21] Appl. No.: 797,274

[22] Filed: Nov. 12, 1985

[30] Foreign Application Priority Data

Nov. 9, 1984 [JP] Japan .................................. 59-236367

[51] Int. Cl.⁴ ............................................... H04N 9/79
[52] U.S. Cl. ...................................... 358/310; 358/906
[58] Field of Search ............... 358/335, 342, 310, 906; 360/33.1, 35.1

[56] References Cited

U.S. PATENT DOCUMENTS

| | | | |
|---|---|---|---|
| 4,262,301 | 4/1981 | Erlichman | 358/906 |
| 4,366,501 | 12/1982 | Tsunekawa et al. | 358/310 |
| 4,527,205 | 7/1985 | Konishi | 360/35.1 |
| 4,599,657 | 7/1986 | Kinoshita et al. | 358/906 |

Primary Examiner—Donald McElheny, Jr.
Attorney, Agent, or Firm—Sughrue, Mion, Zinn, Macpeak & Seas

[57] ABSTRACT

A multi-mode electronic camera capable of operating in any of a video camera mode, a one-shot video camera mode, and a still camera mode, and in which the image of the object being photographed can be checked at any time with the use of a color video monitor and recorded on a video tape. The luminance/color-difference signal output of an image pickup signal processing circuit is applied to an encoder circuit which converts it to the form of a compound video signal. The latter is applied to the inputs of the color video monitor and a video tape recorder.

4 Claims, 7 Drawing Sheets

MULTI-MODE ELECTRONIC CAMERA

BACKGROUND OF THE INVENTION

The present invention relates to an electronic camera having a plurality of photographing and recording modes.

Recently, there has been developed an electronic still camera having an optical system in which the optical image of an object is formed on an image pickup element, an exposure control system in which an amount of exposure corresponding to the luminance of the object is set for the image pickup element, and a recording system in which the output signal of the image pickup element is recorded as a field or frame of a still picture on a magnetic disk. The electronic still camera is advantageous in that the exposure time can be freely selected; however, it is nevertheless disadvantageous in the following points: The recording medium is a magnetic disk on which signals are recorded concentrically. Therefore, the electronic still camera is not suitable for photographing motion pictures. In the case of an electronic still camera having an optical viewfinder, the state of the object cannot be confirmed if the eye is moved from the viewfinder. Therefore, the camera is not suitable for the case where it is required for a person remote from the camera to perform the photographing operation. In addition, it is impossible for a plurality of persons to simultaneously observe the object through the viewfinder.

On the other hand, it is well known in the art that, in a conventional video camera and VTR system, the output signals of the image pickup element are recorded as motion pictures on a magnetic tape, and the image of the object can be confirmed through a monitor at all times. In the video camera as in the electronic still camera described above, an image pickup signal is obtained from an image pickup element. Therefore, if the electronic still camera is deisgned so as to be able to operate in a video camera mode, then it can be expected that the above-described difficulties accompanying the electronic still camera will be eliminated and the types of applications for the electronic still camera expanded.

In the case where the video camera mode is provided for the electronic still camera, the image of an object can be confirmed with a monitor. Therefore, a system taking a middle position between those of the electronic still camera and the video camera can be considered in which one field (corresponding to an exposure time of 1/60 second) or one frame (corresponding to an exposure time of 1/30 second) of a still picture is recorded on a magnetic disk (hereinafter referred to as "a one-shot video camera system" when applicable).

SUMMARY OF THE INVENTION

In view of the foregoing, the invention provides a multi-mode electronic camera in which mode changeover switches are provided, and a still camera mode, a video camera mode, and a one-shot video camera mode can be selected by operating the mode changeover switches according to the intended purpose of use.

DESCRIPTION OF THE PREFERRED EMBODIMENTS

A preferred embodiment of the invention will be described with reference to the accompanying drawings.

Figure 1:
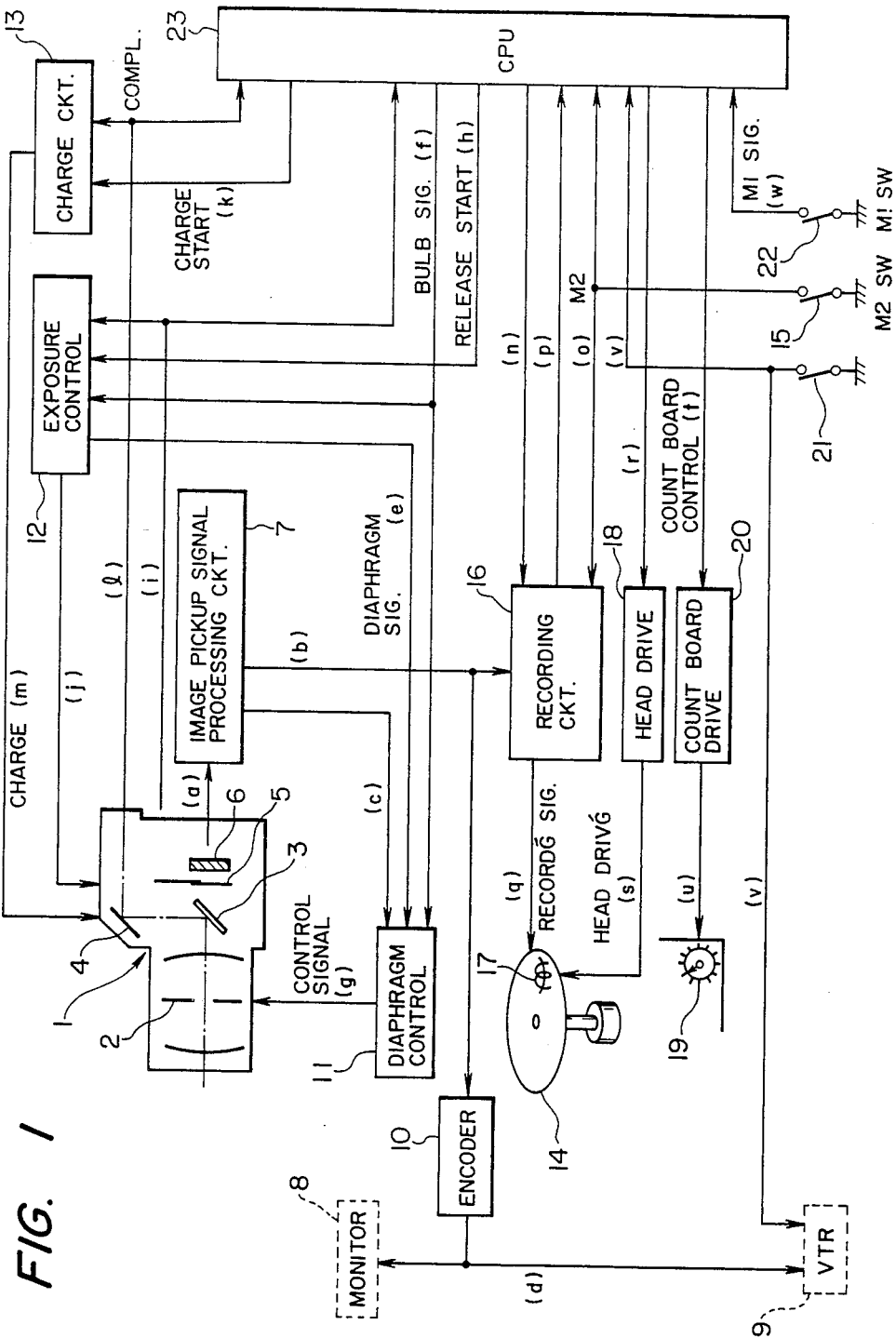
FIG. 1 is a block diagram of a preferred embodiment of an electronic still camera of the invention.

FIG. 1 is a block diagram showing a multi-mode electronic camera constructed according to the invention. This electronic camera 1, as in a conventional electronic still camera, includes a diaphragm 2, a movable mirror 3, a stationary mirror 4, a shutter 5, and a solid-state image pickup element 6 for subjecting the optical image of an object to photoelectrical conversion.

Further, the control system of the camera 1 includes an image pickup signal processing circuit 7 which receives an image pickup output signal (a) from the solid-state image pickup element 6 and outputs a luminance/-color-difference signal (b) and a low-luminance signal (c) used to control the diaphragm 2 in the case of bulb exposure; an encoder circuit 10 which receives the luminance/color-difference signal (b) and outputs a compound color television signal (d) which is applied to a monitor 8 and a VTR 9; a diaphragm control circuit 11 which receives the low luminance signal (c), a diaphragm signal (e) used to control the diaphragm 2 when bulb exposure is not employed, and a bulb signal (f) indicating the fact that bulb exposure is being employed, the circuit 11 outputting a control signal (g) for controlling the diaphragm; an exposure control circuit 12 which receives the bulb signal (f), a release start signal (h), and a bottom curtain signal (i) indicating the fact that the bottom curtain has been run, the circuit 12 outputting the diaphragm signal (e) and an exposure control signal (j) for controlling exposure time; a charge circuit 13 which receives a charge start signal (k) for starting the charging of the movable mirror 3 and the shutter 5 and a charging completion signal (l) indicating the fact that the movable mirror 3 and the shutter 5 have been charged, the circuit 13 outputting a charging signal (m) for charging the movable mirror 3 and the shutter 5; and a recording circuit 16 which receives the luminance/color-difference signal (b), a recording start signal (n) for starting a recording operation on a magnetic disk 14, and a signal M2 (o) indicating a still camera mode or a one-shot video camera mode which is obtained by turning on or off a switch M2 15 when the video camera mode is not employed, the circuit 16 outputting a recording completion signal (p) indicating the fact that a recording operation with the magnetic disk 14 has been accomplished and a picture recording signal (q).

The control system further includes a head driving circuit 18 which receives a tracking signal (r) for controlling the tracking of the magnetic head 14 and outputs a head driving signal (s) for driving a magnetic head 17; a count board driving circuit 20 which receives a count board control signal (t) and outputs a count board driving signal (u); and a central processing unit 23 which receives the bottom curtain signal (i), the change completion signal (l), the M2 signal (o), the recording completion signal (p), a release signal (v) indicating the fact that a release switch 21 has been operated, and an M1 signal (w) indicating whether or not the video camera mode is employed in association with the on-off operation of an M1 switch 22, and outputs the bulb signal (f), the charging start signal (k), the release start signal (h), the recording start signal (n), the tracking signal (r) and the count board control signal (t).

The operation of the electronic camera thus constructed will now be described.

In this embodiment, the M1 switch 22 and the M2 switch 15 are operated to select one of the video camera mode, the still camera mode, and the one-shot video camera mode. More specifically, when the M1 switch 22 is turned on, the video camera mode is selected irrespective of the on or off state of the M2 switch 15; when the M1 switch 22 is turned off and the M2 switch 15 is turned on, the still camera mode is selected, and when the M1 switch 22 is turned off and the M2 switch 15 is also turned off, the one-shot video camera mode is selected.

In the video camera mode, the central processing unit 23 outputs the bulb signal (f), and the exposure control circuit 12 produces the exposure control signal (j) so that the movable mirror 3 is swung upwardly and only the top curtain of the shutter 5 is run for bulb exposure. The movable mirror 3 thus swung is mechanically held. Accordingly, the solid-state image pickup element 6 is exposed to light continuously, thus applying the image pickup output signal (a) to the image pickup signal processing circuit 7.

Upon reception of the bulb signal (f), the diaphragm control circuit 11 produces the diaphragm control signal (g) in response to the low luminance signal (c) supplied from the image pickup signal processing circuit 7. Therefore, the diaphragm 2 operates as an automatic diaphragm. The encoder circuit 10 provides the compound color television signal (d) at all times. Therefore, if the signal (d) is applied to the monitor 8, the state of the object can be confirmed. Furthermore, by applying the compound color television signal (d) and the release signal (v) for telerecording control to the VTR 9, the telerecording operation of the VTR 9 can be controlled; the telerecording operation is started by turning on the release switch 21 and suspended by turning off the switch 21. In this operation, the central processing unit 23 receives no release signal (v) and continuously produces the bulb signal (f).

In the one-shot video camera mode, the recording operation is effected with the magnetic disk 14, and therefore the VTR 9 is electrically disconnected. The M1 switch 22 and the M2 switch 15 are operated to select the one-shot video camera mode. As a result the central processing unit 23 outputs the bulb signal (f). Therefore, similarly as in the above-described video camera mode, bulb exposure is effected and the diaphragm 2 is operated automatically. In this operation, the state of the object is confirmed by inputting the compound color television signal (d) to the monitor 8; that is, the state of the object can be confirmed by viewing the monitor 8 at any time.

When the release switch 21 is turned on, the central processing unit 23, in response to the release signal (v), produces the recording start signal (n). As a result, the recording circuit 16 produces the picture recording signal (g), causing the magnetic disk 14 to record a picture for one field or one frame. When the recording operation is accomplished, the recording circuit 16 provides the recording completion signal (p). The picture for one field and the picture for one frame correspond to a picture for 1/60 second and a picture for 1/30 second, respectively.

Upon reception of the recording completion signal (p), the central processing unit 23 produces the tracking signal (r) and the count board control signal (t). Upon reception of the tracking signal (r), the head driving circuit 18 provides the head driving signal (s), causing the magnetic head 17 to move to a predetermined position. Similarly, upon reception of the count board control signal (t), the count board control circuit 20 produces the count board driving signal (u) causing the count board 19 to move to a predetermined position. Thus, a series of operations in the one-shot video camera mode are accomplished.

Next, the operation of the above-described embodiment in the case where the video camera mode or the one-shot video camera mode is switched over to the still camera mode will be described.

In the video camera mode or in the one-shot video camera mode, bulb exposure is employed. However, when the video camera mode or the one-shot video camera mode is switched over to the still camera mode, the production of the bulb signal (f) by the central processing unit 23 is suspended. Therefore, the exposure control circuit 12 stops the provision of the exposure control signal (j) used to effect the holding of the bottom curtain so that the bottom curtain is run. Further, as the production of the bulb signal (f) is suspended as described above, the diaphragm control circuit 11 is changed so as to produce the diaphragm control signal (g) in response to the diaphragm signal (e). At that time instant, the release operation has not yet been effected and the diaphragm 2 is set open.

When the bottom curtain runs as described above, the bottom curtain signal (i) is produced. Upon reception of the signal (i), the central processing unit 23 outputs the charging start signal (k). The charging circuit 13 receives the signal (k) and in response produces the charging signal (m), charging the movable mirror 3 and the shutter 5. Upon completion of the charging operation, the charging completion signal (l) is produced and applied to the charging circuit 13, whereupon the charging circuit 13 suspends the production of the charging signal (m) and the central processing unit 23 is placed in a state where the release operation is permitted. The charging completion signal (l) is eliminated when the movable mirror 3 is moved upwardly.

In the still camera mode, even when the release switch 21 is turned on under the condition that no charging completion signal (l) is present, the central processing unit 23 does not receive the release signal. In the still camera mode, the recording operation is carried out with the magnetic disk 14, and therefore the VTR 9 is electrically disconnected. If no release operation is carried out, no light, being blocked by the shutter, is applied to the solid image pickup element 6, and the monitor 8 cannot be used. Therefore, an optical viewfinder must be used to view the object.

When, in the still camera mode, the release switch 21 is turned on, the release signal (v) is applied to the central processing unit 23 so that the latter produces the release start signal (h). The exposure control circuit 12 receives the signal (h) and outputs the diaphragm signal (e). The diaphragm control circuit 11 receives the signal (e), and hence produces the diaphragm control signal (g) to set the aperture value (2) to a predetermined value. Next, the composure control circuit 12 produces the exposure control signal (j), holding the bottom curtain of the shutter, swinging the movable mirror 3 upwardly, and running the top curtain of the shutter 5. After a predetermined period of time, the bottom curtain of the shutter 5 is run. At that time, the exposure has been accomplished.

When the bottom curtain is run as described above, the bottom curtain signal (i) is produced and applied to the exposure control signal 12, whereupon the latter suspends application of the diaphragm signal (e) to the diaphragm control circuit 11. Therefore, the diaphragm control circuit 11 also suspends application of the diaphragm control signal (g) so that the diaphragm 2 is fully opened again. On the other hand, upon reception of the bottom curtain signal (i), the central processing unit 23 provides the recording start signal (n). The image pickup output signal (a) provided when the solid-state image pickup element 6 is exposed is applied through the image pickup signal processing circuit 7, as the luminance/color-difference signal (b), to the recording circuit 16. In the recording circuit 16, the luminance/color-difference signal (b) is converted into the picture recording signal (q), and hence recording operation is effected upon the magnetic disk 14. Upon completion of the recording operation, the recording completion signal (p) is applied to the central processing unit 23, whereupon the latter outputs the charging start signal (k), producing the charging signal (m), and thereby charging the movable mirror 3 and the shutter 5. When the head driving circuit 18 receives the tracking signal (r), it outputs the head driving signal (s) so that the magnetic head 17 is moved to the next recording track. The count board driving circuit 20 receives the count board control signal (t) and produces the count board driving signal (u) so that the count board 19 is advanced by one graduation. When the movable mirror 3 and the shutter 5 have been charged, the charging completion signal (l) is produced and applied to the charging circuit 13, whereupon the latter suspends application of the charging signal (m). After receiving the charging completion signal (l), the central processing unit 23 become able to receive the next release signal (v). Thus, a series of operations in the still camera mode is accomplished.

Figure 2:
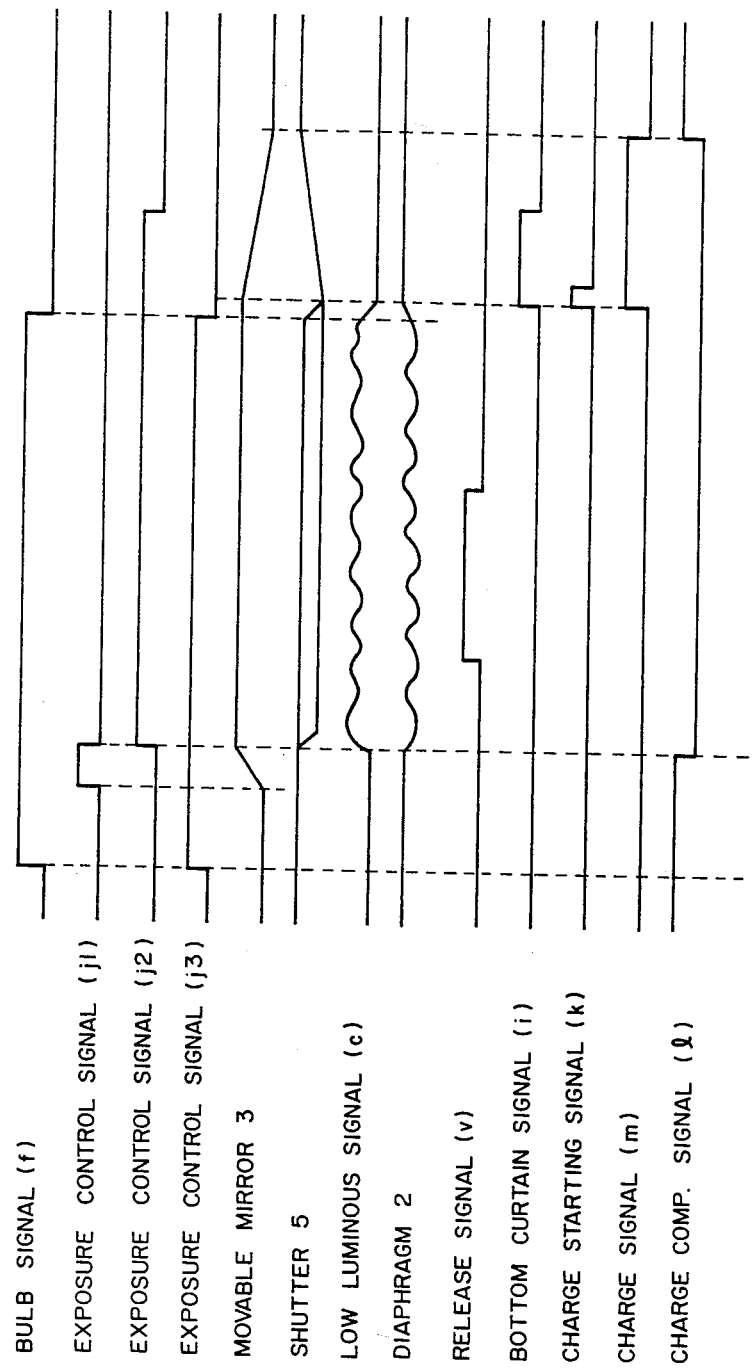
FIG. 2 is a timing chart for a description of the operation of the FIG. 1 embodiment in a video camera mode.
Figure 3:
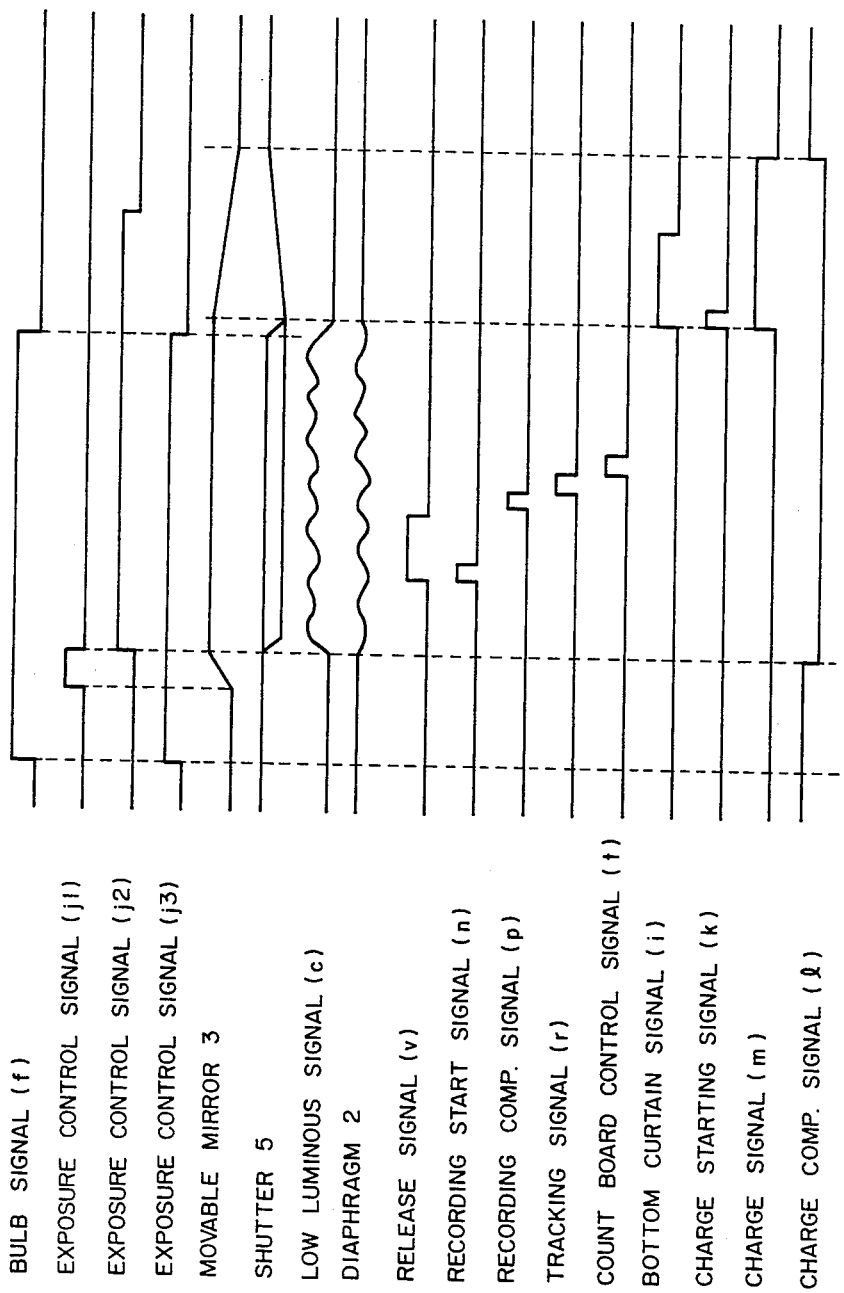
FIG. 3 is a timing chart for a description of the operation of the FIG. 1 embodiment in a one-shot video camera mode.
Figure 4:
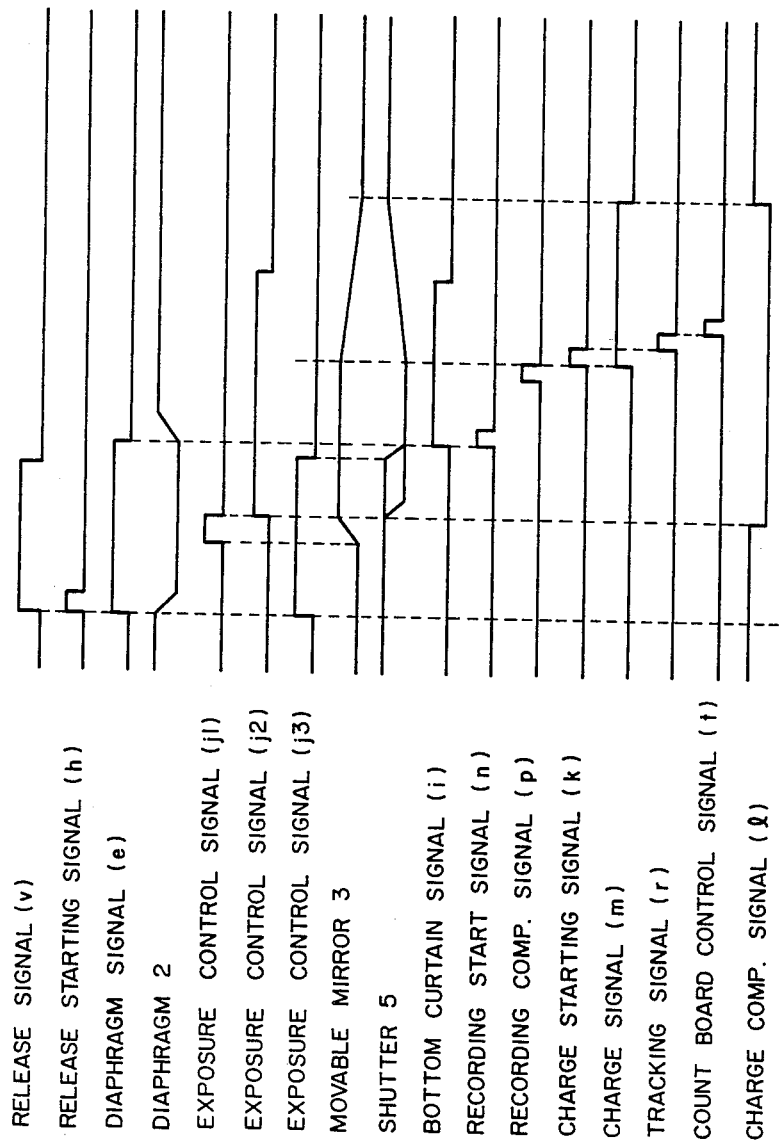
FIG. 4 is also a timing chart for a description of the operation of the FIG. 1 embodiment in a still camera mode.

FIGS. 2, 3 and 4 are timing charts for a description of the operation in the video camera mode, the one-shot video camera mode, and the still camera mode, respectively. As is apparent from FIGS. 2, 3 and 4, three kinds of exposure control signals (j) are provided. The operation of the embodiment will be further described with the three kinds of exposure control signals referred to as exposure control signals (j1), (j2) and (j3).

As shown in FIG. 2, when the still camera mode is switched over to the video camera mode by opening the mode changeover switches, namely, the M1 switch 22 and the M2 switch 15, the bulb signal (f) is produced, as a result of which the exposure control signals (j1), (j2) and (j3) are produced. Due to the presence of the exposure control signal (j3), the bottom curtain is held. Next, in response to the exposure control signal (j1), the movable mirror 3 is lifted and mechanically held. As the movable mirror 3 is lifted, the application of the charging completion signal (l) is suspended. Furthermore, as the movable mirror 3 is moved upwardly, the top curtain of the shutter 5 is run mechanically for bulb exposure, while the exposure control signal (j2) is produced. As the bulb signal (f) is produced, the diaphragm 2, being controlled by the low luminance signal (c), functions as an automatic diaphragm. When, under this condition, the release switch 21 is turned on, the release signal (v) is outputted so that the recording operation is effected with the VTR 9.

When, under this condition, the release switch 21 is turned off, the application of the release signal (v) is suspended, and hence the recording operation is also suspended. When the still camera mode is selected again by operating the mode changeover switches, the bulb signal (f) and the exposure control signal (j3) are eliminated, and the bottom curtain of the shutter 5 is run. When the bottom curtain has run, the bottom curtain signal (i) is outputted. In response to the bottom curtain signal (i), the charging start signal (k) is produced. In addition, the charging signal (m) is produced so that the movable mirror 3 and the shutter 5 are charged. Upon elimination of the bulb signal (f), the diaphragm 2 is fully opened. While the movable mirror 3 and the shutter 5 are being charged, the application of the exposure control signal (j2) and the bottom curtain signal (i) is suspended. When charging has been accomplished, the charging completion signal (1) is produced and application of the charging signal (m) is stopped.

As shown in FIG. 3, when the still camera mode is switched over to the one-shot video camera mode, the bulb signal (f) is produced. Therefore, as in the video camera mode, bulb exposure is effected and the diaphragm 2 is opened automatically. When, under this condition, the release switch 21 is turned on, the release signal (v) is outputted. In response to the release signal (v), the recording start signal (n) is produced so that the recording operation is carried out with the magnetic disk 14. When the recording operation has been accomplished, the recording completion signal (p) is outputted. As a result, the tracking signal (r) and the count board control signal (t) are produced, and thus the magnetic head 17 and the count board 19 are moved to predetermined positions. The next release operation can then be carried out. When, under this condition, the mode is changed over to the still camera mode by operating the switches, the application of the bulb signal (f) is suspended. Therefore, as in the video camera mode, the movable mirror 3 and the shutter 5 are changed and the diaphragm 2 is fully opened again.

As shown in FIG. 4, in the still camera mode, the release signal (v) is produced by turning on the release switch 21, as a result of which the release start signal (h) is outputted. In response to the release start signal (h), the diaphragm signal (e) is produced, whereupon the aperture value is reduced to a predetermined value. On the other hand, since the exposure control signal (j3) is produced, the bottom curtain of the shutter 5 is held. Furthermore, with the aid of the exposure control signal (j1), the movable mirror 3 is moved upwardly and mechanically held. As the movable mirror is moved upwardly as described above, the top curtain of the shutter 5 is mechanically run, while at the same time the exposure control signal (j2) is produced. When the movable mirror 3 is lifted, the application of the charging completion signal (1) is suspended. When a predetermined period of time has passed after production of the exposure control signal (j2), the application of the exposure control signal (j3) is suspended, and hence the bottom curtain is run. When the bottom curtain has run, the exposure has been accomplished, and the bottom curtain signal (i) is produced. In response to the bottom curtain signal (i), the application of the diaphragm signal (4) is suspended, and the diaphragm 2 is fully opened. When the recording start signal (n) is produced, a recording operation is carried out on the magnetic disk 14. When the recording operation is ended, the resulting completion signal (p) is outputted. As a result, the charging start signal (k) is produced and the charging signal (m) is outputted, and thus the movable mirror 3 and the shutter 5 are charged. While the charging operation is being carried out, the tracking signal (r) and the count board control signal (t) are produced to move the magnetic head 17 and the count board 19 to predetermined positions. On the other hand, during the charging operation, the application of the exposure control signal (j2) and the bottom curtain signal (i) is suspended. When the charging operation has been accomplished, the charging completion signal (l) is produced and application of the charging signal (m) is suspended.

Figure 5:
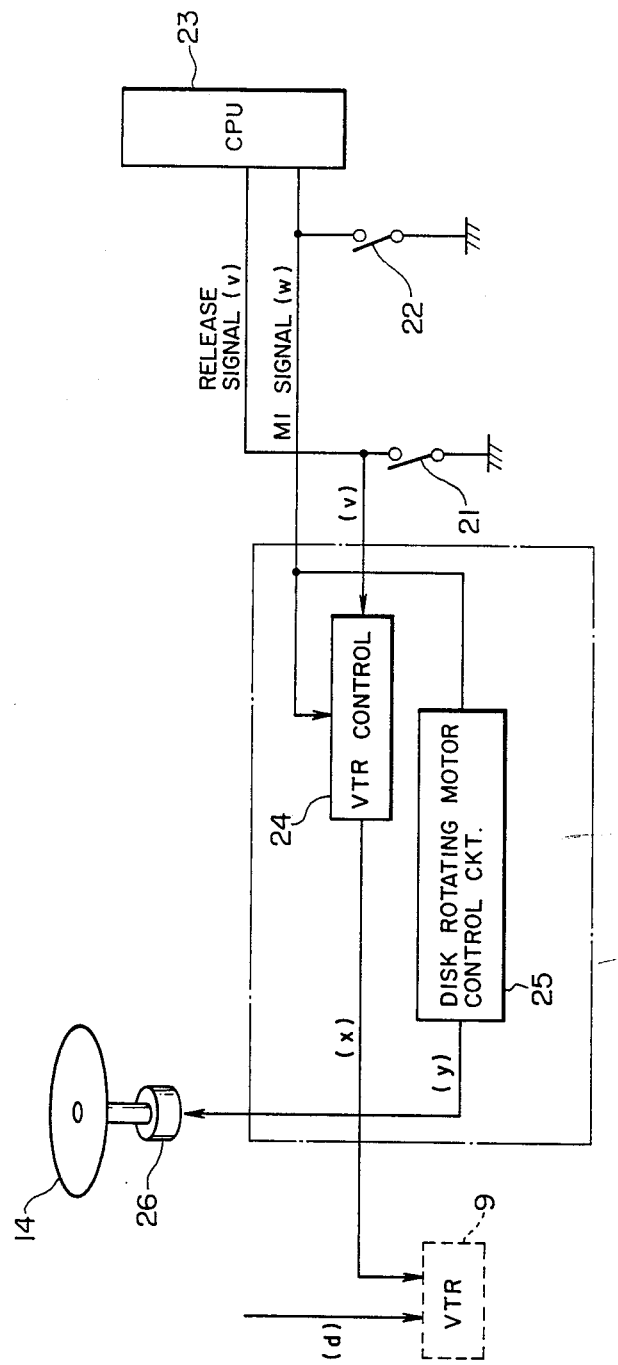
FIG. 5 is a block diagram for a description of a modification of the above-described embodiment.

In the above-described embodiment, in the video camera mode, only the VTR 9 is coupled to the electronic camera 1, while in the one-shot video camera mode or in the still camera mode, the magnetic disk 14 is combined with the electronic camera while the VTR 9 is decoupled therefrom. However, with both the VTR and the magnetic disk 14 coupled to the electronic camera 1, the video camera mode, the one-shot video camera mode or the still camera mode can be selected by operating the mode changeover switches if a circuit defined by the one-dot chain line in FIG. 5 is added to the above-described circuitry shown in FIG. 1. In this modification, only when the M1 switch is turned on, that is, only when the M1 signal (w) is produced, can a VTR control circuit 24 receive the release signal (v) from the release switch 21 to output a VTR control signal (x) for operating the VTR 9, while a disk rotating motor control circuit 25 suspends the application of a control signal (y) used to control the operation of a disk rotating motor 26.

Figure 6A:
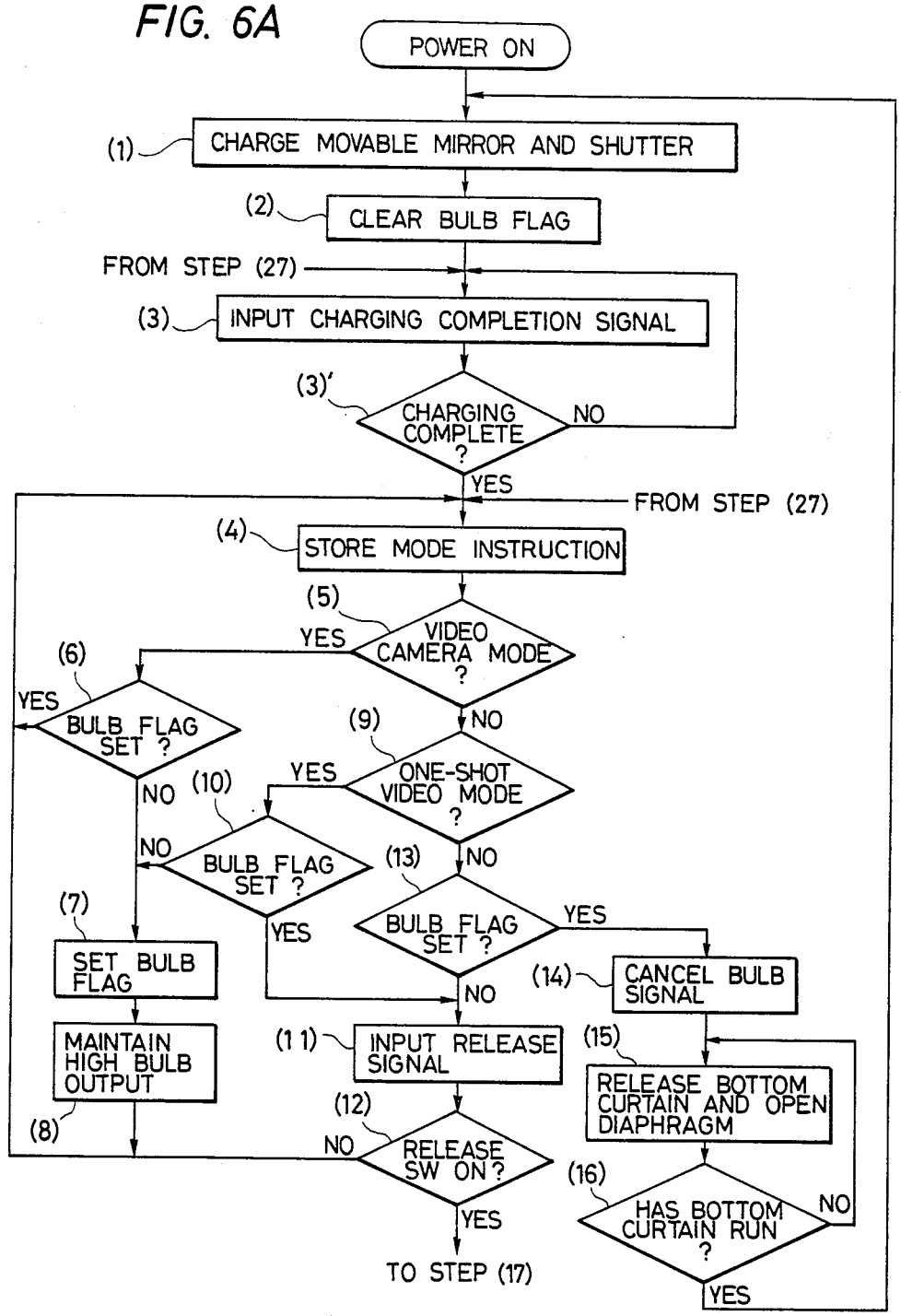
FIGS. 6A and 6B are an example of a flow chart which shows the operation of a central processing unit 23.
Figure 6B:
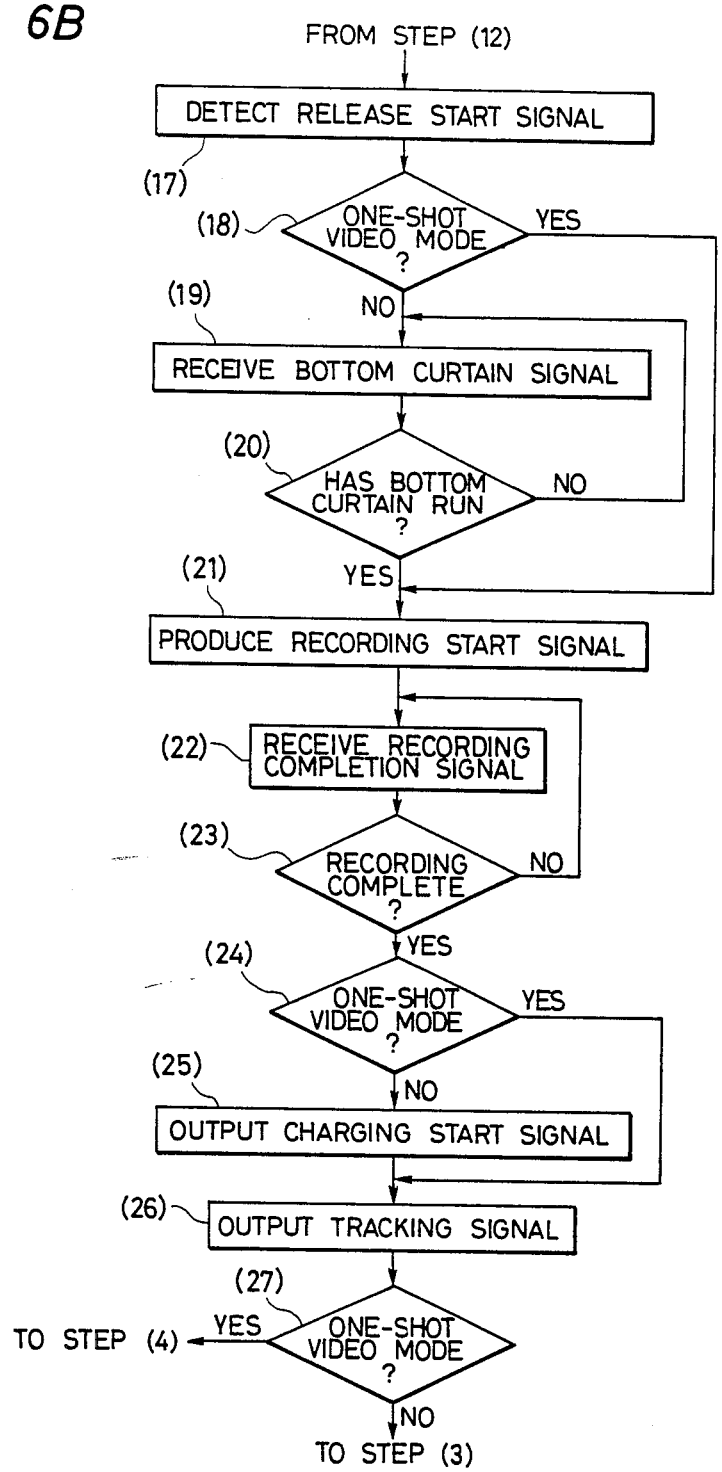

An example of a flow chart for the CPU 23 is shown in FIGS. 6A and 6B. The operation of the electronic camera having three operating modes will be described in detail with reference to the flow chart.

(1) When a power is supplied, the CPU 23 produces the charge start signal (k) to the charge circuit 13 in the step (1). In the case where the movable mirror 3 and the shutter 5 have been not charged, the charge circuit 13 produces a charging signal (m) for charging the movable mirror 3 and the shutter 5 to start the charging operation. On the other hand, when the charging has been completed, no charging signal (m) is needed. The charging condition of the movable mirror 3 and the shutter 5 is judged in response to the charging completion signal (l).

(2) A bulb flag which has been registered in an internal register of the CPU 23 is cleared in the step (2). The bulb flag is registered continuously after a bulb exposure in the video camera mode and the one-shot video camera mode is once set, and then upon releasing the bulb exposure for the still camera mode, the bulb flag is cleared again.

(3) In the step (3'), the CPU 23 operates to decide whether the charging operation has been completed or not in response to the charging completion signal (l) which is input thereto in the step (3). This operation of the steps (3) and (4) is repeated until the charging completion signal (l) is detected in the step (4).

(4) Upon the completion of the charging, the CPU 23 receives the M1 signal (w) and the M2 signal (o) in order to decide a mode instruction. In this case, the signal received by the CPU 23 is stored in the register of the CPU 23.

(5) The CPU 23 operates to determine whether the video camera mode is instructed or not. When the M1 signal (w) shows low level, the CPU 23 detects that the video camera mode is instructed regardless of the signal condition of the M2 signal (o).

(6) When the video camera mode is detected in the step (5), the step advances to the step (6) where the existence of the bulb flag is checked. When the bulb flag is set, that is, when the mode is changed from the one-shot video camera mode to the video camera mode, the camera is already set to the bulb exposure and therefore the step returns to the step (4). Subsequently, the operation is continuously carried out along the routine defined by the steps (4) to (6) until an instruction for changing the mode is issued.

In case of no bulb flag being detected in the step (6), this indicates that the camera has been not set to bulb exposure. In other words, in case of no bulb flag, this indicates the condition that the camera has been already set in the video camera mode when power is supplied, or the mode of the camera is changed from the still camera mode to the video camera mode. In this case, the bulb flag is set in the following step (7), and then the CPU 23 produces the bulb output (f) and the bulb output is maintained at a high level in the step (8).

In response to the bulb output (f), the diaphragm control circuit 11 operates to put the diaphragm in a full opened state and the exposure control circuit 13 operates to put the exposure control mechanism in an automatic control mode. Thereafter, as mentioned above, the operation is carried out according to the routine defined by the steps of (4) to (6) until the next mode changing instruction is issued.

(7) In the step (5), when the camera is not set in the video camera mode, the operation is allowed to go to the step (9) where it is detected whether the camera is put in the one-shot video camera mode or not. When the camera is set in the one-shot video camera mode, a bulb flag checking operation is carried out in the following step (10). When the video camera mode is changed to the one-shot video camera mode, since the bulb flag has been already set, the CPU 23 receives a release signal (v) in the step (11), and then it is detected in the step (12) whether the release switch 21 is turned on or not. If the switch 21 is turned off, the operation returns to the step (4) and the operation according to the routine defined by the steps (4), (5), (9), (10), (11) and (12) is repeated until the switch 21 is turned on to thereby change the camera mode.

In the step (10), it is detected that the bulb flag is not set, that is, the camera is set in the one-shot video camera mode upon the application of power or the camera mode is changed from the still camera mode to the one-shot video camera mode, as mentioned above, the bulb flag is set and then the bulb signal (f) is produced and maintained according to the steps (7) and (8). Thereafter, the operation is carried out according the routine defined in the steps (4), (5), (9), (10), (11) and (12).

(8) When it is detected in the steps (5) and (9) that the camera is not set in both the video camera mode and the one-shot video camera mode, it is determined that the camera is put in the still camera mode. Then, the bulb flag checking operation is carried out in the step (13), and if the bulb flag is not set, this representing the condition that the camera is already set in the still camera mode upon the application of the power, the CPU 23 receives the release signal (v) in the step (11) and to determined whether the release switch 21 is turned on or not in the step (12). In case of the switch 21 being turned off, the operation returns to the step (4). Thereafter, the operation repeats according to the routine defined by the steps (4), (5), (9), (13), (11) and (12) continuously, until the switch 21 is turned on to thereby change the still camera mode to the other camera mode. In the step (13), if it is detected that the bulb flag has been already set, that is, if the camera mode is changed from the video camera mode to the still camera mode or from the one-shot video camera mode to the still camera mode, the bulb signal (f) is cancelled in the step (14) to thereby release the bulb exposure state. In response to the elemination of the bulb signal (f), the exposure control circuit 12d in step (15) releases the holding of the bottom curtain of the shutter 5 so that the bottom curtain is allowed to run and the diaphragm control circuit 11 operates to put the diaphragm 2 in full-opened state. After the elimination of the bulb signal (f), the CPU 23 receives the bottom curtain signal (i) in the step (16) so as to detect whether or not the bottom curtain has run. Upon the completion of the running, the operation returns to the step (1). Subsequently, the CPU 23 operates to output a charging start signal (k) to the charging circuit 13 in the step (1) to start charging the movable mirror 3 and the shutter 5. Then, the bulb flag is cleared in the following step 2. The CPU 23 receives the charging completion signal (l), and it is detected whether or not the charging operation is completed in the step 3'. After this operation, upon the completion of the charging operation, the operation goes to the step 4. The camera is continuously put in the still camera mode according to the routine defined by the steps (4), (5), (9), (13), (11) and (12) until the release switch 21 is turned on to change the camera mode to the other video camera or one-shot video camera mode.

(9) In the video camera mode, the video signal is recorded in the VTR 9 by the function of the release switch 21 regardless of the control of the CPU 23. On the other hand, in the still camera mode or the one-shot video camera mode, if the release switch 21 is turned on while the operation is carried out by either routine of the steps (4), (5), (9), (13), (11) and (12) or routine of the steps (4), (5), (9), (10), (11) and (12), the CPU 23 outputs the release start signal (h) to the exposure control circuit 12. It is detected in the step (12) whether or not the release switch 21 is turned on. In the still camera mode, after the detection of the release start signal (h) which is produced in the step (17), the exposure control circuit 12 and the diaphragm control circuit 11 operate to allow a solid state image pickup element to be exposed with a predetermined suitable exposure amount.

In the step (18), it is detected whether the camera is set to the one-shot video camera mode or not. If not, the CPU 23 receives the bottom curtain signal (i) in the step (19), and upon the detection of the completion of the bottom curtain running in the step (20), the CPU 23 produces a recording start signal (n) in the step (21). When the recording circuit 16 receives the recording start signal (n), the circuit 16 operates to record a luminance/color-difference signal (b) onto a magnetic disk 14. The luminance/color-difference signal (b) is obtained by converting an image pickup output signal (a) in the image pickup signal processing circuit 7. Thereafter, the CPU 23 receives the recording completion signal (p) in the step (22) and then the CPU 23 detects whether the recording is completed or not in the step (23). After the repetition of this operation, when completion of the recording is detected in step (24), the CPU 23 produces the charging start signal (k) to the charge circuit 13 in the step (25) so as to start the charging of the movable mirror 3 and the shutter 5. In the step (24), the camera mode is detected to determine whether or not it is set to the one-shot video camera mode. Further, in the step (26), the CPU 23 produces a tracking signal (r) and the count board control signal (t) to move the magnetic head 17 and the count board 19 to predetermined positions, respectively. After the step (26), the operation returns to the step (3) through the step (27) where it is detected whether the camera is set to the one-shot video camera mode or not, and the operation is suspended until the charging of the movable mirror 3 and the shutter 5 is completed. Upon the completion thereof, the operation is continuously carried out according to the routine of the steps (4), (5), (9), (13), (11) and (12).

In case of the one-shot video camera mode, the bulb exposure is always effected and thus the bottom curtain is not required to run. Accordingly, when the release start signal (h) is produced in the step (17) and then it is detected in the step (18) that the camera is set to the one-shot video camera mode, the operation skips over the steps (19) and (20) to the step (21) where the CPU 23 produces the recording start signal (n). Thereafter, the above described same operation is carried out.

As is apparent from the above description, according to the invention, any one of the still camera mode, the video camera mode, or the one-shot video camera mode can be selected by operating the mode changeover switches. Therefore, the multi-mode electronic camera of the invention can photograph a variety of objects in various photographic circumstances. Although the three modes can be selectively used, the electronic camera of the invention differs only in the addition of the encoder circuit from the conventional electronic still camera. Thus, the electronic camera of the invention is excellent in cost performance. In addition, the electronic camera can be made small in size and light in weight and can be readily handled.

What is claimed is:

1. A focal plane shutter type single-lens reflex camera comprising: an optical system including a lens, a shutter, and a diaphragm; photoelectric image pickup means for sensing a light image passing through said optical system and producing a low luminance signal and a luminance/color-difference signal; a monitor; an optical viewfinder; magnetic tape recording means for recording signals corresponding to moving images; magnetic disk recording means for recording signals corresponding to still images; mode selecting means for selecting among a video camera mode, a still camera mode and a one-shot video mode; and controlling means operating in response to said mode selecting means for, (i) in said video camera mode, holding said shutter open, controlling said diaphragm with said low luminance signal, displaying images sensed by said image pickup means on said monitor, and recording said luminance/color-difference signal continuously with said magnetic tape recording means, (ii) in said one-shot video mode, operating said shutter in response to a release signal and for a time determined by a luminance of an image being sensed by said image pickup means, and recording said luminance/color-difference signal with said magnetic disk recording means, and (iii) in said still camera mode, holding said shutter open, controlling said diaphragm with said low luminance signal, displaying images sensed by said image pickup means on said monitor, and recording one of a frame and a field of said luminance/color-difference signal with said magnetic disk recording means.

2. The focal plane shutter type single-lens reflex camera of claim 1, further comprising encoder means for converting said luminance/color-difference signal to a compound color signal for display by said monitor and for recording with said magnetic tape recording means.

3. The focal plane shutter type single-lens reflex camera of claim 1, wherein said mode selecting means comprises first and second switch means, said first switch means selecting between (a) said video camera mode and (b) said still camera and one-shot video modes, and said second switch means selecting, when said first switch means selects said still camera and one-shot video modes, between (c) said still camera mode and (d) said one-shot video mode.

4. The focal plane shutter type single-lens reflex camera of claim 3, wherein said magnetic tape recording means operates to start and stop recording in response to an output of said first switch means and said release signal.

* * * * *